UNITED STATES PATENT OFFICE.

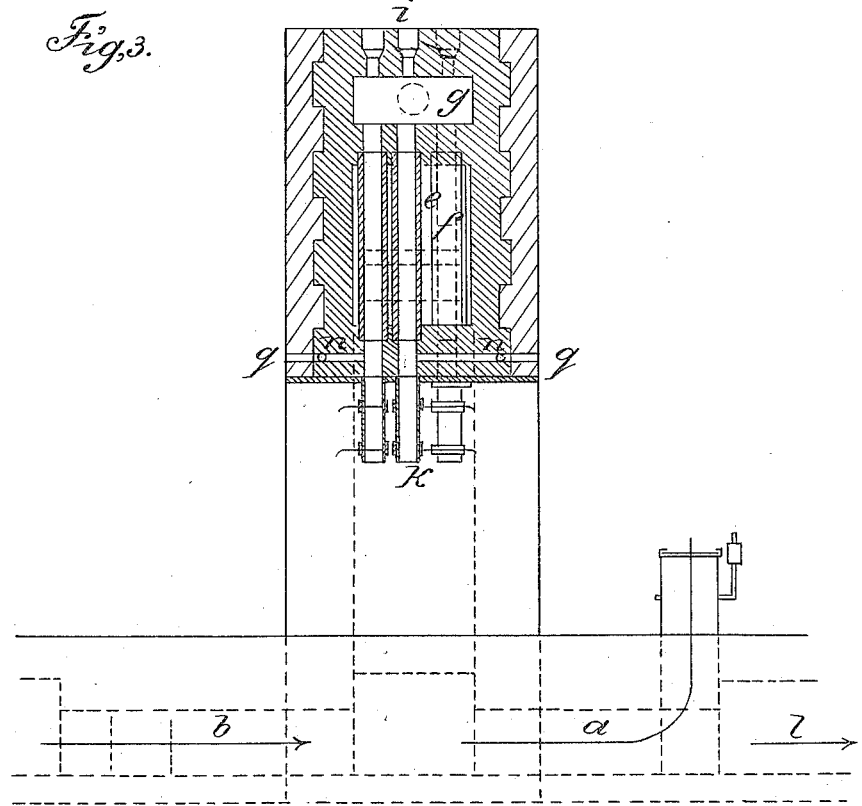

GEORG GIULINI, OF LAZZAGO, NEAR COMO, ITALY.

PROCESS OF PRODUCING ALUMINIUM NITRID.

1,180,840.    Specification of Letters Patent.    Patented Apr. 25, 1916.

Application filed December 26, 1912. Serial No. 738,675.

*To all whom it may concern:*

Be it known that I, GEORG GIULINI, manufacturer, subject of the King of Italy, residing at Lazzago, near Como, Kingdom of Italy, have invented a new and useful Improvement in Processes of Producing Aluminium Nitrid; and I do hereby declare the following to be a full, clear, and exact description of the same.

This invention relates to a process and apparatus for the production of aluminium nitrid from alumina, bauxite or other aluminiferous materials.

It is known that when alumina and carbon are heated to very high temperatures in an electric furnace and nitrogen or gas containing nitrogen, is passed over them at the same time, aluminium nitrid is produced. The applicant has discovered however, that aluminium nitrid can be formed by a continuous process at even lower temperatures and without the application of electrical energy.

According to the present invention instead of carbon, alkali metal such as metallic sodium in the state of vapor is employed for reducing the alumina or aluminiferous materials, nitrogen or gas containing nitrogen (*e. g.* producer gas) being allowed to act at the same time.

To the applicant are known the United States Patents to De Chalmot 741396 (October 13, 1903) and to Bosch 957842 (May 10, 1910), but he does not claim what is described in the said patents.

The reaction may be represented by the following equation:

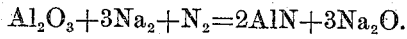

To prevent the sodium oxid (Na$_2$O) formed during the reaction, from acting on the resulting aluminium nitrid, and at the same time to make the former suitable for a new reduction, it is advisable to add carbon to the alumina or aluminiferous materials, which carbon reduces the resulting Na$_2$O to the metallic state again, in accordance with the equation:—

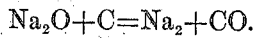

By this means the sodium required for the reduction of the alumina is partially regenerated and only about one-third of the theoretical quantity of sodium needed for the process has actually to be employed.

For generating the sodium vapor, use is preferably made of one of the known methods, such for instance as the reduction of sodium carbonate by carbon. Instead of producing the sodium in a special furnace and allowing it to act in the form of vapor on the alumina or aluminiferous materials heated along with carbon, the whole of the reactions:—the production of the sodium, reduction of the alumina and the formation of the nitrid can be advantageously carried on in one and the same furnace.

One form of apparatus which may be preferably used for carrying out the process continuously according to the present invention is shown in the accompanying drawing, in which—

Figure 1:
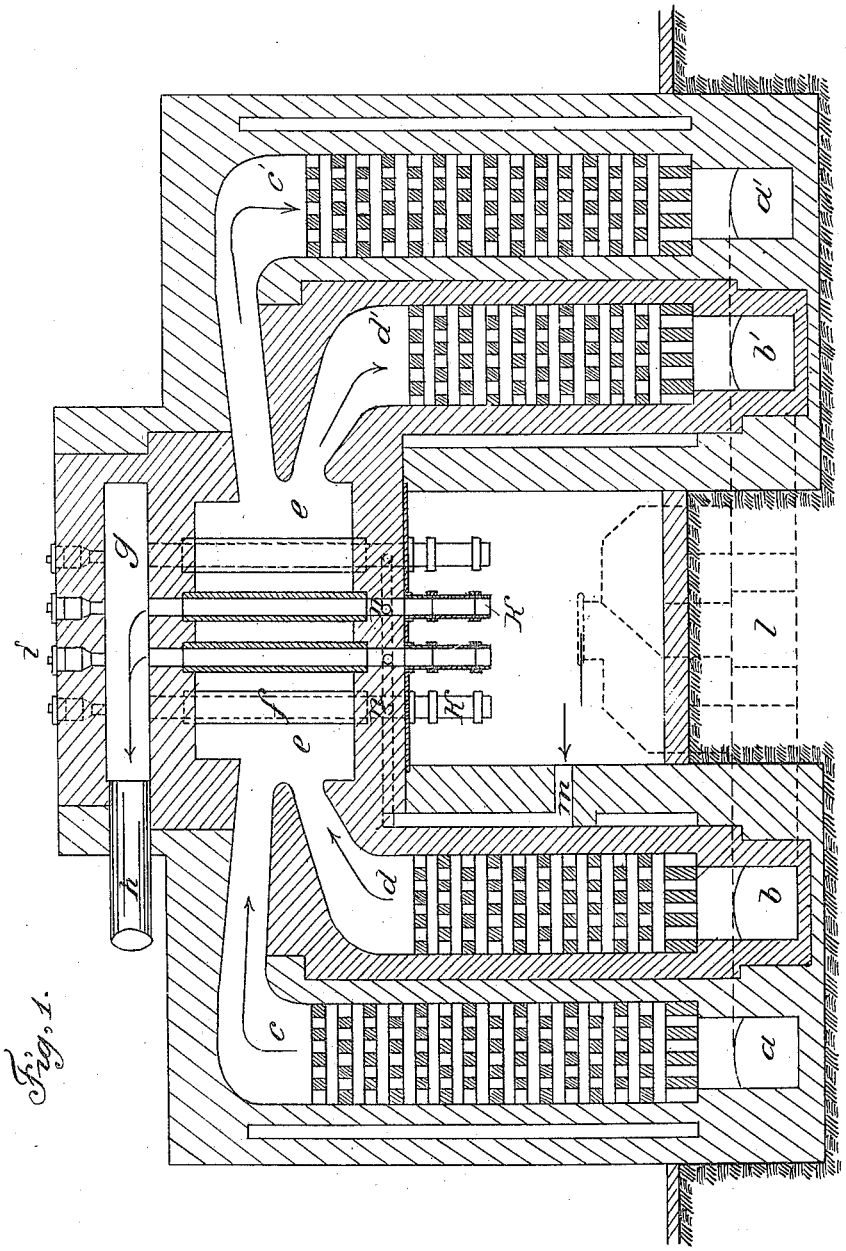
Figure 2:
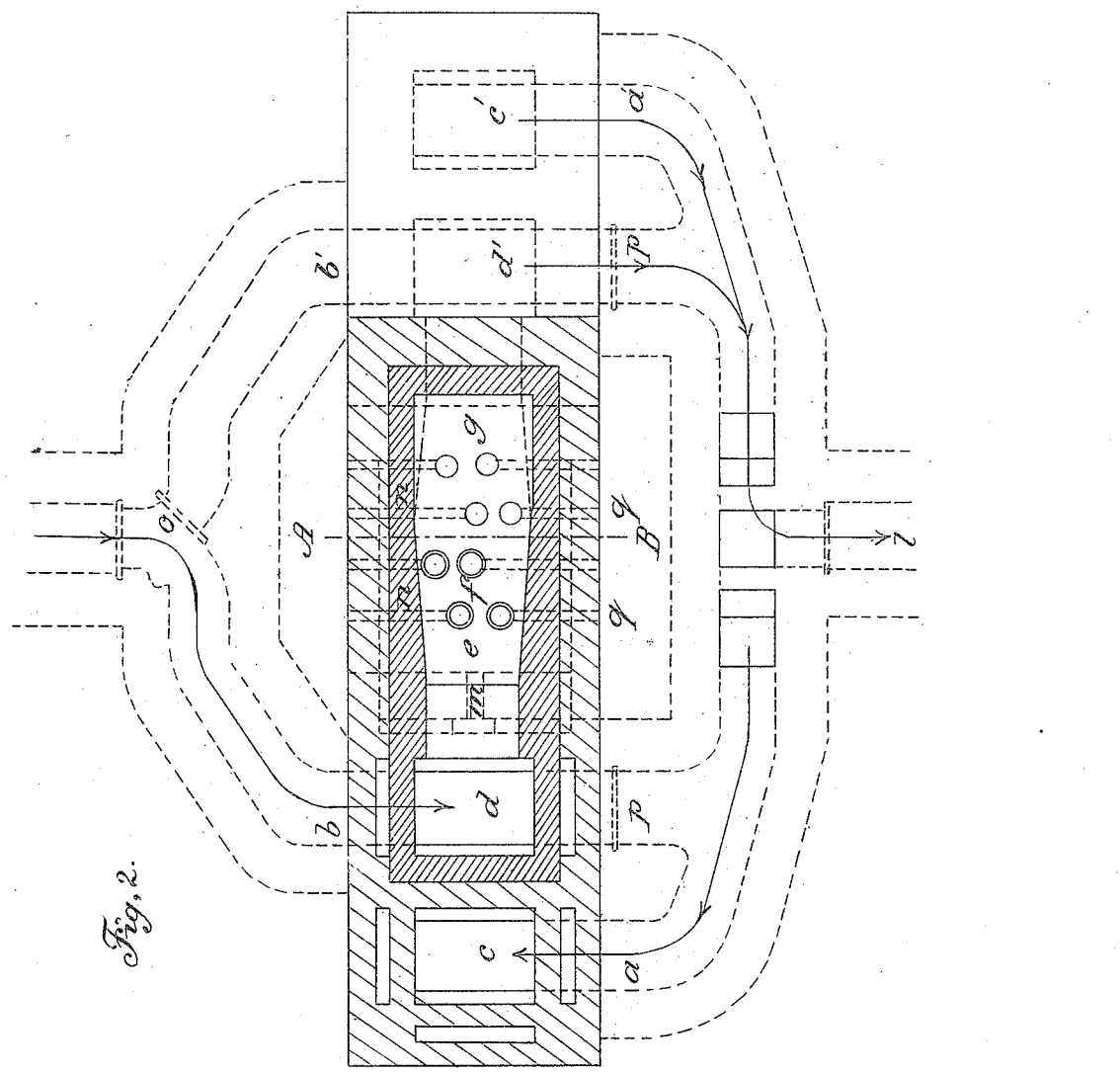

Figure 1 is a vertical section of the apparatus; Fig. 2 is a plan view of same and Fig. 3 is a section on the median line A—B in Fig. 2.

The charge consisting for example of a mixture of sodium carbonate carbon and the aluminiferous material (*e. g.* bauxite) to be treated, is fed through the charging hopper *i* into the tubes *f*. These tubes are made of highly refractory material, and are provided at their lower ends *k* with a discharging device of a kind suitable for continuous working. The nitrogen, or gas containing nitrogen, necessary for the reaction undergoes a preliminary heating in the passage *m* and enters the tubes *f* in a heated condition at *n*. The tubes *f*, the number and arrangement of which can be varied as desired are heated on the regenerative heating principle. Both gas and air are heated in shafts *c d* and *c' d'* containing firebricks and furnish, on combustion, the temperature requisite for the reaction viz: a temperature up to about 1,500° C. The supply of air and gas is regulated by the flap valve *o* and damper *p*. The passages *q* serve to enable any obstructions occurring in the passage *m* to be removed.

The waste gases formed during the process escape through the flue at *g* and *h*. If the process is properly regulated, these waste gases consist chiefly of carbon monoxid, which can be utilized for combustion purposes.

The aluminium nitrid produced is drawn off gradually through the discharging device at *k*, a corresponding quantity of fresh material being introduced through the charging hopper *i*. The aluminium nitrid obtained in this way is particularly adapted for use in the production of pure alumina and ammonia, since it gives an alkaline reaction with water, whereby decomposition is greatly facilitated.

The herein described process for the continuous production of aluminium nitrid, differs from the processes hitherto known, in that metallic sodium is used in place of carbon for reducing the alumina or aluminiferous materials. This feature gives the advantage to produce the aluminium nitrid at comparatively low temperatures, so that the process can be carried on continuously without the application of electrical energy, a result hitherto unattainable. Moreover, only about 30% of the amount of sodium theoretically needed for the reduction of the alumina is actually needed, because, a continuous regeneration of the sodium by the added coal or carbon occurs during the course of the reaction.

The process furnishes a product which, in addition to containing a high percentage of nitrogen, has the advantage that, in consequence of its alkaline reaction, it is admirably adapted for further treatment for the production of pure alumina and ammonia.

Having now particularly described and ascertained the nature of my said invention and in what manner the same is to be performed, I declare that what I claim is:—

1. The process for the production of aluminium nitrid which consists in causing gases containing nitrogen along with alkali metal in a nascent state to act on mixtures of compounds containing alumina and reducing agents at a temperature below that of the electric arc, but as high as the temperature at which nascent alkali metal reacts on alumina compounds in the presence of nitrogen.

2. The process for the production of aluminium nitrid which consists in heating compounds containing alumina with carbon and alkali metal carbonate to a temperature at which alkali metal is formed in a nascent state but below the temperature of the electric arc and conducting gases containing nitrogen through the mass.

3. The process for the production of aluminium nitrid which consists in arranging vertical columns of a mixture of compounds containing alumina with carbon and alkali metal carbonate, heating the said mixture in order to form from carbon and alkali carbonate alkali metal and conducting heated gases containing nitrogen from the bottom of the said column vertically to the top, drawing off the formed aluminium nitrid at the bottom of the said column and replacing at the top of the said column the mixture of compounds containing alumina with carbon and alkali metal carbonate consumed by the formation of aluminium nitrid.

In testimony whereof I affix my signature in presence of two witnesses.

GEORG GIULINI.

Witnesses:
F. H. LOGAN,
WM. H. BERRIGAN.